July 31, 1962 C. S. CLARK 3,047,146
METHOD AND APPARATUS FOR DETECTING FLAWS
Filed Nov. 8, 1960 3 Sheets-Sheet 3
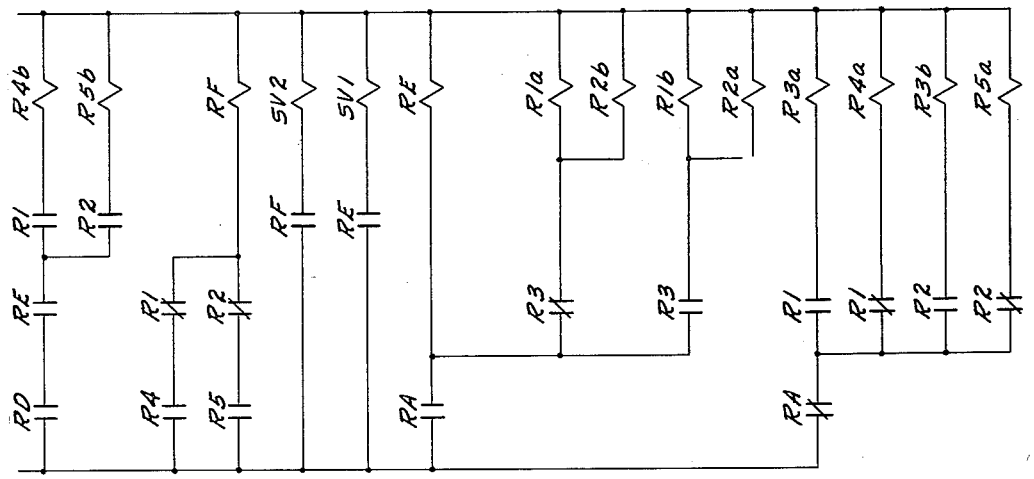
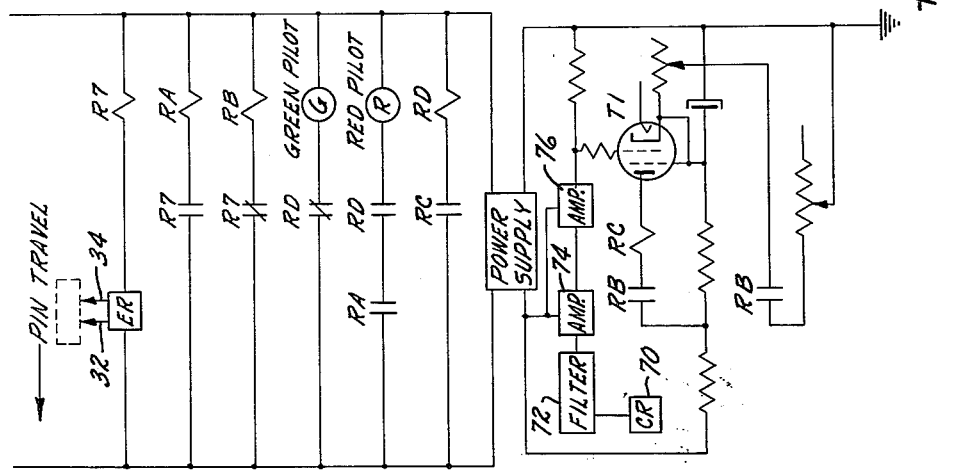
Fig. 6.
INVENTOR.
Carlos S. Clark,
BY Parker & Carter
Attorneys.

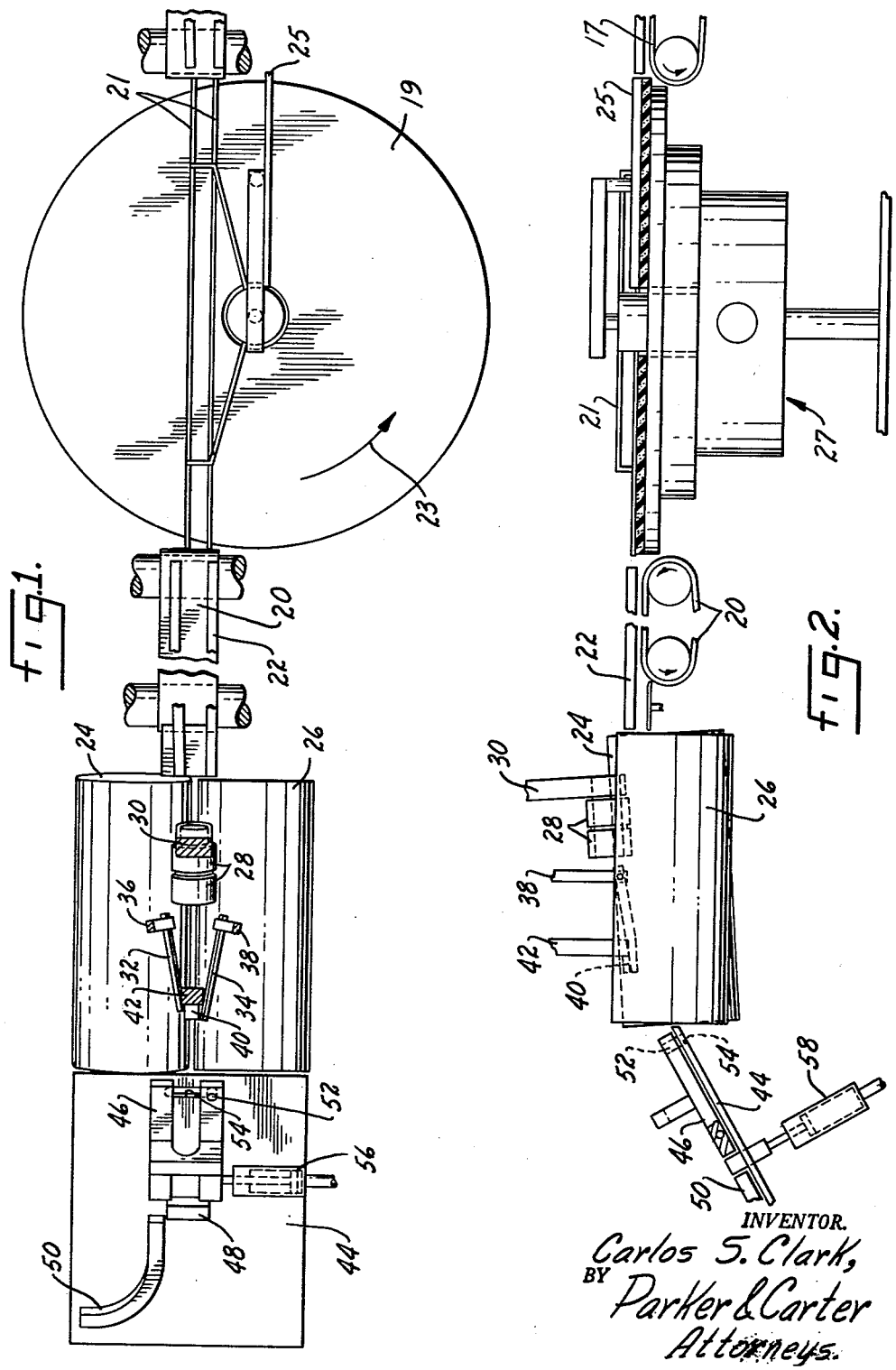

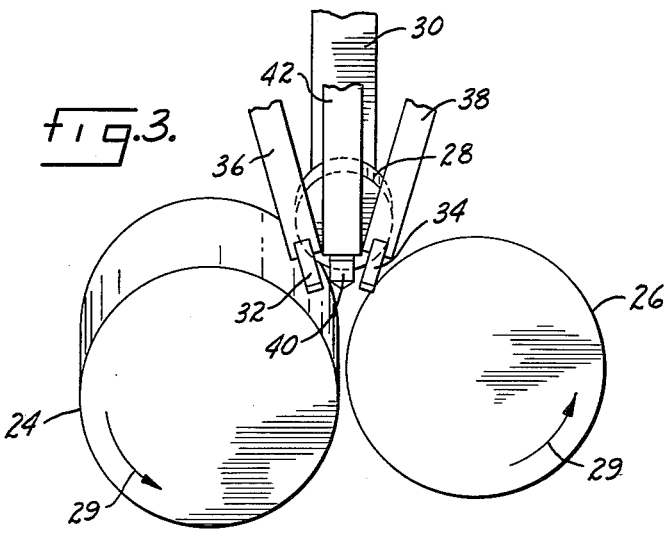
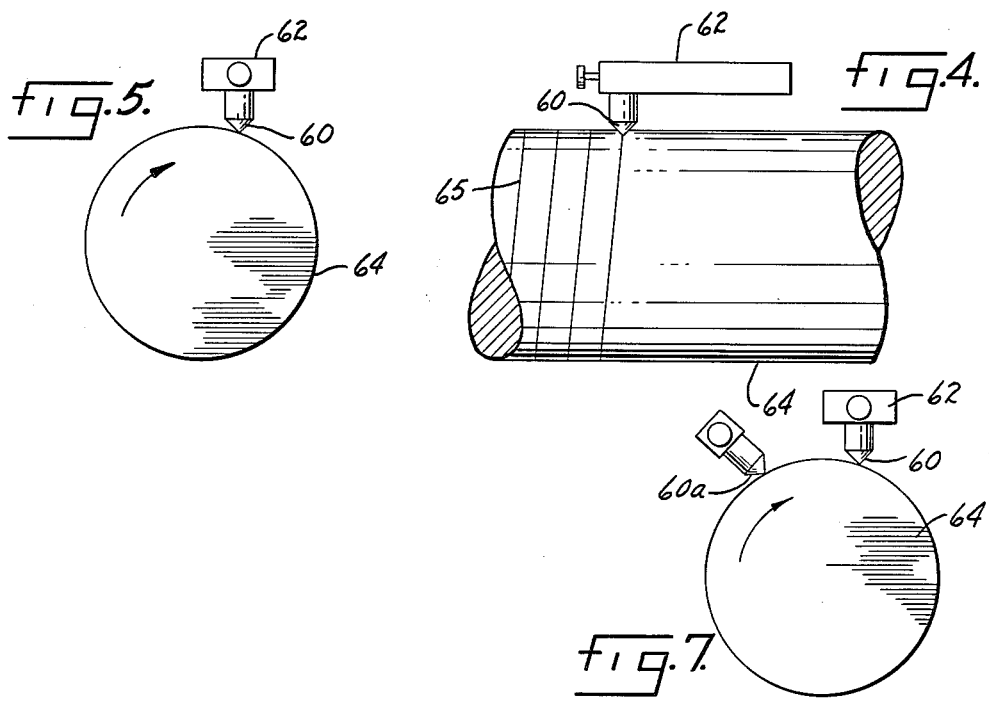
INVENTOR.
Carlos S. Clark,
BY Parker & Carter
Attorneys.

United States Patent Office 3,047,146
Patented July 31, 1962

3,047,146
METHOD AND APPARATUS FOR DETECTING FLAWS

Carlos S. Clark, Batavia, Ill., assignor to Burgess-Norton Mfg. Co., Geneva, Ill., a corporation of Illinois
Filed Nov. 8, 1960, Ser. No. 68,043
13 Claims. (Cl. 209—72)

This invention relates to an inspection system for detecting flaws or seams in the surface of cylindrical machine parts such as piston pins or the like, and is a continuation-in-part of my copending application Serial No. 802,879, filed March 30, 1959, now abandoned.

One purpose of this invention is to provide an automatic inspection system for piston pins or the like.

Another purpose of the invention is to provide an inspection system for piston pins in which pins having seams or other defects are registered so that they may be rejected at a further point in the system.

Another purpose is to provide a piston pin inspection system utilizing a conditioning device to control the inspection system reject means.

Another purpose is to provide a piston pin inspection system in which the size of any defect, seam or other flaw is automatically compared with a predetermined reference.

Other purposes will appear in the ensuing specification, drawings and claims.

The invention is illustrated diagrammatically in the following drawings, wherein:

FIGURE 1 is a diagrammatic top plan view of my inspection system,

FIGURE 2 is a diagrammatic side view of the inspection system of FIGURE 1,

FIGURE 3 is an enlarged front view of part of the inspection system of FIGURE 1, FIGURE 4 is a side plan view of a piston pin with my detecting head in engagement therewith, FIGURE 5 is an end view of the piston pin and detecting head of FIGURE 4, FIGURE 6 is a schematic view of the memory circuit used with my inspection system, and FIGURE 7 is an end view of a piston pin with a modified form of detecting head.

Referring now to FIGURES 1 and 2, a suitable conveyor or the like 17 carries the piston pins or other cylindrical workpieces which are being inspected to a rotating table 19. A pair of guide rails 21 are positioned above the table 19 so that the pins received on the table will be guided there-across. The pins will be bunched one behind the other whereby the pins coming off the conveyor will push the pins across the rotating table 19.

In some applications the pins will be carried from a suitable solvent bath by the conveyor 17 to the table 19, in which case it is the function of the table to remove the excess liquid from the pins. The direction of rotation of the table as shown by arrow 23 is counterclockwise. A wiper or the like 25 acts as a squeegee and removes excess liquid from the rotating table. The wiper then will remove the excess liquid from the table so a comparatively dry surface is presented to the entering pin. The rotating table and wiper may be supported by a suitable support indicated generally at 27.

The pins moving across the rotating table along the guide rails 21 are carried to a second conveyor 20. In the preferred form the conveyor 20 runs at a slower speed than the conveyor 17 so that pins are bunched up on the conveyor 20 and form an unbroken line. The conveyor 20 has a pair of guide rails 22 positioned above it so that the pins may be properly aligned as they move along.

Adjacent the conveyor 20 are a pair of rotating drums 24, 26. As shown in the drawings, the drums are slightly spaced apart and the drum 24 is tilted so that it forms an angle with the drum 26. As shown by arrows 29 in FIGURE 3, the drums each have the same direction of rotation, which as shown is counterclockwise. The direction could also be clockwise, as the important thing is that the drums should both rotate in the same direction. By positioning the adjacent drums so that one is tilted downward, when a piston pin is introduced between the two drums by the conveyor 20 it will be longitudinally moved at a predetermined rate. The rate the piston pin will move is set by the speed of rotation of the drums and the angle that drum 24 makes with drum 26. In order for the system to function properly the speed of the pin as it moves along between the drums should be somewhat greater than the speed of the conveyor 20 so that the pins will be spaced apart as they move through the actual inspection part of the system.

A pair of rollers 28 are held by a support 30 and are positioned above the rotating drums. The rollers function to prevent the pin from bouncing as it goes through the inspection system. Spaced from the rollers 28 are a pair of electrical contacts, 32, 34. The contacts are held in position above the rotating drums by supports 36, 38. The electrical contacts are adjacent a detecting head 40 which will be described more fully below. The detecting head 40 is positioned above the rotating drums by the support 42. FIGURE 3 clearly shows the position of the electrical contacts and detecting head.

At the end of the inspection system and adjacent the left hand end of the rotating drums, as shown in the drawings, is a reject mechanism. The reject mechanism includes an inclined plate 44 mounting a movable guide 46, which receives the piston pins from the rotating drums. Mounted at the end of the guide 46 is a gate 48. The gate 48 stops the pin from moving out of the guide. Adjacent the gate is a curved slide 50 which directs the rejected pins into a suitable container.

The guide 46 has a downwardly projecting pin 52 which projects into a slot 54 in the plate 44. A piston or the like which may be operated by air pressure or by some other form of hydraulic pressure is shown at 56. This piston is connected to the guide 46 so that when the piston is operated, the guide, which is spaced above the plate 44, is pushed across the plate and pin 52 moves in the slot 54. When the guide 46 has been moved to its fullest extent the end of the guide will open into the area formed by the slide 50 so that rejected pins may be directed to a suitable container.

Placed below the plate 44 is a second piston 58 which operates the gate 48. Normally the gate is in the up position shown in FIGURE 2, however, when a pin is to be passed through the inspection system the piston 58, which may be operated again by air or some form of hydraulic pressure, allows the gate to drop down below the level of the plate 44 so that the piston pin may slide to a suitable container placed below. When an acceptable pin comes through the inspection system it will be held in the guide 46 until the succeeding pin is in contact with the electrical contacts 36, 38. These electrical contacts will actuate the conditioning system hereinafter described which controls the gate 48 and the movement of the slide 46. If the pin is acceptable the gate 48 will drop down and the pin will slide down the inclined plate 44, whereas if the pin is to be rejected the piston 56 operates to push the slide so that the piston may fall into the area formed by the curved slide 50. As shown in the drawings either the gate or the slide operates when a pin passes through the system, however the system works equally well if the gate operates for every pin and the movement of the slide determines to which area the pin will go.

The detecting head 40 which was shown diagrammatically in FIGURES 1 and 2 is shown more clearly in FIGURES 4 and 5. In the preferred form the detecting head includes a diamond point 60 which may be similar to the diamond point which is commonly used in a Rockwell Hardness Tester. The point 60 is supported by an arm 62 in which may be housed a suitable crystal cartridge or a magnetic cartridge. Both a magnetic pickup and a crystal pickup have been found to be equally satisfactory.

The diamond point 60 is under sufficient pressure so that when a piston pin, such as shown at 64, is going through the inspection system a smooth shallow spiral groove, such as that shown at 65, is formed in the pin throughout its length. This groove is slightly below the ground surface of the pin so that there will be no false readings due to surface irregularities. It is the purpose of the point to detect seams or other major defects in the pins and not merely slight surface irregularities. Vibration of the point 60 as it forms a groove in the pin is sufficient to cause a vibration in the cartridge in the arm 62. This vibration will cause the cartridge to produce an electrical signal which signal is transmitted to the conditioning circuit hereinafter described.

As shown in FIGURE 5, the diamond point 60 is not centered above the piston pin, but is placed away from the direction of rotation so that the pin will move down past the diamond point rather than up into it.

FIGURE 7 shows a modified form of detecting head in which there are two diamond points 60 and 60a. The spiral groove may be formed by diamond point 60a and diamond point 60 may be used to detect any defects in the workpiece. Needle 60a would have no crystal or magnetic pickup as it is only used to form the spiral groove.

The conditioning circuit for use in the inspection system of this invention is shown in FIGURE 6. All of the relays of FIGURE 6 are in the position they would occupy when the circuit is energized, and a pin is not in contact with the electrical contacts 32, 34 which are given the designation ER in FIGURE 6. To better understand the electrical circuit of FIGURE 6, it should be explained that relays R1 through R5 have two coils, one of which latches or closes the relay, and the other coil unlatching or opening the relay. The latching coil in each case is designated by (a) after the relay number and the unlatching coil is designated by (b) after the relay number. These relays are conventional and may be purchased from a number of sources.

In order to understand the operation of the circuit, it will be explained in connection with a series of piston pins which are moving through the inspection system. Initially, 24 volts D.C. is applied to that portion of the circuit on the right hand side of FIGURE 6, and 120 volts A.C. is applied to the left hand portion of the circuit. Relays R4 and R5 will close as coils R4a and R5a are energized. At the same time relay RB is energized and will move to the position shown. Accordingly, both the plate and cathode circuits of the tube T1 will be open as relay RB has a pair of contacts connected into both these circuits. The green pilot light will be turned on at the same time.

The first pin now comes in contact with the electrical contacts 32 and 34, shown as ER in FIGURE 6, so that R7 is energized which closes relay RA and opens RB. At the same time then the plate and cathode circuits of tube T1 will be closed. The closing of relay RA will close relays RE and R1 and open relay R2.

The detection circuit of FIGURE 6 includes a crystal or magnetic cartridge 70, the output of which is fed to a filter 72 and then through two amplifiers 74 and 76 to the grid of tube T1. The coil of relay RC is in the plate circuit of tube T1, and as will be explained hereinafter, if the signal to the grid of tube T1 provides sufficient plate current to operate relay RC, it is indicative of an unsatisfactory piston pin or similar workpiece. In other words, if the vibration of crystal 70, which is caused by defects or other irregularities in the surface of the workpiece being scanned, can provide sufficient grid voltage to operate the relay RC in the plate circuit, it indicates an unsatisfactory workpiece.

In this case considering the first pin to pass into the system, the pin is in satisfactory condition and hence relay RC is not activated. Accordingly, when relay RE closes, solenoid valve SV1 controlling the gate 48 is operated such that the gate is lowered.

As soon as the piston pin leaves terminals 32 and 34, relay R7 will open so that relays RA and RB will open and close respectively and return to the positions of FIGURE 6. When relay RB closes, the plate and cathode circuits of tube T1 are again open. When relay RA opens, relay RE will also open. When relay RE opens, stop gate solenoid valve SV1 is deenergized so that gate 48 will raise and hold the piston pin which has just passed through the inspection system, and which has been accepted, in the guide 46 for subsequent passage to the acceptable bin.

The next step in the operation is the contact by the second pin in the inspection system with contacts ER and hence the closing of relay R7. As before, relay RB will open so that the plate and cathode circuits of plate tube T1 will close, and relay RA will close, as will relay RE. As before, the stop gate solenoid valve SV1 will be lowered so that the accepted pin held in the slide 46 will pass to the acceptable bin. Relay R2 will now close and relay R1 will open to condition other relays for subsequent operation.

The second piston pin is unacceptable and accordingly there is a signal received from the cartridge 70 which passes through filter 72 and the amplifiers 74 and 76 to the grid of tube T1. The signal is of sufficient strength such that the current flowing in the plate circuit of tube T1 will operate relay RC and close this relay. When relay RC closes, relay RD will close and the green pilot light will go off and the red pilot will go on indicating an unacceptable pin in the inspection system. Coil R5b is now activated and relay R5 opens to condition the circuit for subsequent rejection of the unacceptable pin.

As soon as pin No. 2 leaves terminals 32 and 34 and moves into slide 46, R7 will once again be deenergized and RB will close and RA will open. When RB closes, the plate and cathode circuits of tube T1 are once again opened and when RA opens, relay RE will open as will stop gate solenoid valve SV1. When SV1 is deenergized gate 48 will raise and hold the second piston pin in slide 46. Once the plate circuit of tube T1 is open, RC will release and accordingly relay RD will then release. The red pilot light will then go off and the green pilot light will go on.

When the third pin comes in contact with the input terminals, relay R7 will once again close. Accordingly, relay RB will be deenergized so that the plate and cathode circuits of T1 will close and relay RA will be energized so that relay RE will close. At the same time, relay R1 will close and relay R2 will open. When relay R2 opens, and as relay R5 is already open, relay RF will close. In other words, relay R2 will move to the position of FIGURE 6 and as relay R5 has already been moved to a position opposite that of FIGURE 6, the coil of relay RF will be energized. When relay RF closes, the reject mechanism solenoid valve SV2 will close to operate piston 56 and hence move the slide such that the pin in the slide will be deposited in the reject bin.

As the third pin moving to the inspection system is acceptable, there will be no signal received from the cartridge 70 and relay RC will not operate. Accordingly, when the third pin leaves the input terminals, relay R7 will again open, closing relay RB and opening the plate and cathode circuits of tube T1. As before, relays RA and RE and the coil controlling solenoid SV1 all will open to prepare for the next pin moving through the system. Reject solenoid valve SV2 will now be deenergized and the reject mechanism will move back into its original position and await the next unacceptable pin.

As can be seen from the above description, each pin passing through the inspection system operates the conditioning circuit such that the preceding pin is passed either to an acceptable bin or to a reject bin. The circuit is conditioned by the preceding pin in that an unacceptable pin, while in the inspection system and while in contact with the cartridge, will open relay R5. Accordingly, when the subsequent pin closes relay R7, and relay R2 is once again moved to the unlatched position, relay RF will close and activate the reject mechanism. In other words, the preceding pin conditions the relays such that when the succeeding pin contacts the electrical system and closes relay R7, the preceding pin will be rejected.

The use, operation and function of the invention are as follows:

In the past piston pins or similar cylindrical work pieces have been inspected by devices which necessitated the removal of the pin from the assembly line by an inspector. This was not satisfactory in that it required a man at all times to stand by the assembly line. Furthermore, in some instances it required a man to carefully study the piston pins as they went through the line. Shown and described herein is an inspection system which automatically inspects piston pins or other generally cylindrical work pieces for seams or other defects and automatically rejects unacceptable pins.

In using the invention the piston pins are first conveyed from a suitable solvent bath by means of a conveyor 17 to the rotating table 19. Table 19 operates to remove the excess liquid from the piston pin. From the wheel 19 the pins are carried by means of another conveyor 20, which in the preferred form operates at a slower speed than the wheel 19 and the conveyor 17 so that the pins are closely bunched together and are end to end. The conveyor 20 carries the pins to the rotating drums. The rotating drums are so spaced and positioned that a pin will move longitudinally thereof once it is introduced at one end of the drums. The speed of the drums and hence the speed of the pin as it moves along the drums is slightly greater than the speed of the conveyor 20. This provides for controlled spacing between adjacent pins. As the pins move into the inspection system they are held down against the drums by means of rollers so that they will not bounce around and prevent accurate electrical contact. After the rollers, I have positioned electrical contacts 32 and 34 and a detecting head in the form of a hard surfaced point 60. When the pin comes in contact with the contacts 32, 34 it actuates a conditioning system. The pin also contacts the point 60. As the pin moves into the diamond point 60 it is revolving and the pressure from the diamond point will cause a small shallow spiral groove to be formed on the outer surface of the pin. This groove is not deep enough to damage or impair the usefulness of the pin but does go below the ground surface so that any slight irregularities or surface defects will not be registered.

As the pin rotates under the diamond point any seam that is contacted will cause the diamond point to vibrate and will cause an electric signal to be produced in the cartridge 70. The signal from cartridge 70 may be filtered and is amplified before passing to the grid of tube T1. If this signal has sufficient strength, indicating an unacceptable pin, it will operate relay RC in the plate circuit as described before. There is a visual indication at this time in that the green pilot light, normally lit in operation, is extinguished and the red pilot light indicating a defective pin is lit. A signal indicating a defective pin then conditions or registers on the conditioning circuit so that this pin may later be rejected when it has moved into the slide 46.

After the pin has passed completely under the detecting head 40, it falls from the ends of the rotating drums into the slide 46. The slide is inclined so that once the gate 48 is moved away from the front of the slide the pin may move down into the acceptable bin.

At the same time that one pin is moving into the slide 46 the following pin is coming underneath the detecting head 40. Once the following pin contacts electrical contacts 32, 34 and the point 60, the relay operation is as described before. If the preceding pin was defective, relay RF will operate, which moves piston 56 and slide 46 so that the defective pin will be moved into the area formed by the slide 50 and will be allowed to drop into a reject bin. Gate 48 will also be operated, but the pin will be moving toward slide 50 and so will not fall to the acceptable bin. If the preceding pin was not defective then piston 56 will not operate and the pins will pass as gate 48 is lowered. The conditioning circuitry may be arranged so that both gate 48 and slide 46 will move when a pin is to be rejected, or it may be arranged so that only the slide will move when a pin is to be rejected. Additionally, although not shown in the drawings, a mechanical or electrical counter may be attached to the memory circuit to record the number of defective pins.

It can thus be seen that in the operation of my inspection system the pin is introduced into the system and scanned for any defects or flaws. Any defect found is compared against a standard, the standard being the current strength that is required to operate relay RC in the plate circuit of tube T1. When a pin with a defect has been found the conditioning system and associated relays are conditioned to reject that pin once it is moved into the slide. The actual rejection of the pin is accomplished by the succeeding pin moving into the inspection system and operating the electrical contacts.

There are various modifications, substitutions and alterations possible without departing from the scope of the invention. For example the exact details of the conveyors are not important as long as sufficient means are provided to convey the pins to the rotating wheel and from the rotating wheel to the rotating drums. Also the detecting head has been described as a diamond point similar to that used in Rockwell Hardness Testers. Again the invention is not limited thereto as the exact nature and details of the head are not important as long as there is a means for forming a shallow spiral groove in the pin and as long as defects found by this groove can cause vibration of the head. The pickup or cartridge used to produce the electrical signal indicative of a defect may be either in the form of a magnetic cartridge or a crystal cartridge as they are equally satisfactory. The conditioning circuit has been described generally as the invention is not limited to any particular schematic showing of circuit elements. The only requirement of the conditioning circuit is that it be able to compare an electric signal against a predetermined reference and if the signal is above that reference, register it, in the case shown by setting certain relays.

The invention is not limited to the specific details of construction described above and illustrated in the accompanying drawings, but covers all modifications coming within the scope of the following claims.

I claim:

1. An inspection system for cylindrical workpieces or the like including a hard surface point for scanning said workpieces, said point being positioned relative to said workpieces so that defects in said workpieces cause vibration of said point, means for producing an electrical signal in response to vibrations of said point, a conditioning circuit for comparing said signal against a predetermined reference, signals exceeding said reference indicating a defective workpiece, said signals indicating a defective workpiece registering on said conditioning circuit, and means for rejecting a defective workpiece when the succeeding workpiece enters the inspection system and actuates the conditioning circuit.

2. The structure of claim 1 in which said hard surface point is a diamond point.

3. The structure of claim 1 in which said means for producing an electrical signal include a crystal cartridge.

4. The structure of claim 1 in which said means for producing an electrical signal include a magnetic cartridge.

5. An inspection system for workpieces or the like including a hard surface point for contact scanning said workpieces, defects in said workpieces causing vibration of said point, means for producing an electrical signal in response to vibration of said point, a conditioning circuit for comparing said signal against a predetermined reference and to register signals exceeding said reference, signals exceeding said reference indicating a defective workpiece, and defective workpiece reject means actuated by said conditioning circuit when the succeeding workpiece enters the inspection system and actuates the conditioning circuit.

6. An inspection system for workpieces or the like including a means for rotating said workpieces, a hard surface point positioned to form a shallow spiral groove in said workpieces, defects in said workpieces causing vibration of said point, means for producing an electrical signal in response to vibration of said point, a conditioning circuit for comparing said signal against a predetermined reference and to register signals exceeding said references, signals exceeding said reference indicating a defective workpiece, and a defective workpiece reject means actuated by said conditioning circuit when the succeeding workpiece enters the inspection system and actuates the conditioning circuit.

7. The structure of claim 6 in which said means for producing an electrical signal include a crystal cartridge.

8. The structure of claim 6 in which said means for producing an electrical signal include a magnetic cartridge.

9. An inspection system for workpieces or the like including a means for rotating said workpieces, a hard surface point positioned to form a shallow spiral groove in said workpieces, a second hard surface point positioned to move along said groove, defects in said workpieces causing vibration of said second hard surface point, means for producing an electrical signal in response to vibration of said second point, a conditioning circuit for comparing said signal against a predetermined reference and to register signals exceeding said reference, signals exceeding said reference indicating a defective workpiece, and a defective workpiece reject means actuated by said conditioning circuit.

10. An inspection system for cylindrical workpieces or the like including a pair of rotating drums conveying means for introducing cylindrical workpieces at spaced intervals between said drums, rotation of which moves said workpieces longitudinally thereof, a detecting head adjacent said drums for scanning said workpieces for defects, including a hard surface point positioned to form a shallow spiral groove in said workpieces, and means for automatically rejecting defective workpieces.

11. An inspection system for cylindrical workpieces or the like including a pair of rotating drums, conveying means for introducing workpieces at spaced intervals between said drums, rotation of which moves said workpieces longitudinally thereof, a detecting head adjacent said drum for scanning said workpieces for defects, and means for registering a defective workpiece so that when the succeeding workpiece enters the inspection system and actuates the registering means, the preceding workpiece, if defective, will be rejected.

12. An inspection system for workpieces or the like including a pair of rotating drums, conveying means for introducing cylindrical workpieces at spaced intervals between said drums, rotation of which moves said workpieces longitudinally thereof, a hard surfaced point positioned to contact said workpieces as they are longitudinally moved by said rotating drums, vibration of said point producing an electrical signal, a conditioning device for registering a signal so produced, and a reject means operated by said conditioning device for separating defective from non-defective workpieces.

13. An inspection system for workpieces or the like including a pair of rotating drums, conveying means for introducing cylindrical workpieces at spaced intervals between said drums, rotation of which moves said workpieces longitudinally thereof, a hard surfaced point positioned to contact said workpieces as they are longitudinally moved by said rotating drums, vibration of said point producing an electrical signal, a conditioning device for receiving said signal and comparing it against a predetermined reference, signals exceeding said reference being registered on said conditioning device, and a reject means operated by said conditioning device for separating defective from non-defective workpieces.

References Cited in the file of this patent

UNITED STATES PATENTS

| 2,051,695 | Glacy | Aug. 18, 1936 |
| 2,429,891 | Neff | Oct. 28, 1947 |
| 2,660,304 | Box | Nov. 24, 1953 |
| 2,778,497 | Bickley | Jan. 22, 1957 |

FOREIGN PATENTS

| 704,599 | Great Britain | Feb. 24, 1954 |
| 758,635 | Great Britain | Oct. 10, 1956 |